United States Patent [19]
Yamagishi et al.

[11] Patent Number: 4,948,427
[45] Date of Patent: Aug. 14, 1990

[54] PROCESS FOR PREPARING INK FOR INK JET PRINTER

[75] Inventors: Yasuo Yamagishi, Zama; Toshiaki Narusawa; Norio Sawatari, both of Sagamihara; Katsuji Ebisu, Isehara, all of Japan

[73] Assignee: Fujitsu Limited, Kawasaki, Japan

[21] Appl. No.: 358,459

[22] Filed: May 30, 1989

Related U.S. Application Data

[63] Continuation of Ser. No. 113,409, Oct. 27, 1987, abandoned, which is a continuation of Ser. No. 779,567, Sep. 24, 1985, abandoned.

[30] Foreign Application Priority Data

Sep. 28, 1984 [JP] Japan ................. 59-202070

[51] Int. Cl.$^5$ ............................. C09D 11/02
[52] U.S. Cl. ......................... 106/20; 106/22
[58] Field of Search ............ 106/20, 22; 346/1.1

[56] References Cited

U.S. PATENT DOCUMENTS

| | | | |
|---|---|---|---|
| 3,904,392 | 9/1975 | VanIngen et al. | 55/15 |
| 4,323,980 | 4/1982 | Lee et al. | 346/140 R |

FOREIGN PATENT DOCUMENTS

| | | |
|---|---|---|
| 51-20591 | 2/1976 | Japan . |
| 53-20882 | 12/1978 | Japan . |
| 54-18975 | 2/1979 | Japan . |
| 55-17571 | 2/1980 | Japan . |
| 55-84672 | 6/1980 | Japan . |
| 55-87569 | 7/1980 | Japan . |
| 55-128464 | 10/1980 | Japan . |
| 57-190059 | 11/1982 | Japan . |
| 58-80354 | 5/1983 | Japan . |

OTHER PUBLICATIONS

Patent Abstracts of Japan, vol. 4, No. 49 (M-7), 15 Apr. 1980, p. 22 M7; and JP-A-55 17571 (Suwa Seikosha K.K.) 07-02-80.

Analytical Chemistry, vol. 46, No. 9, 9 Aug. 1974, pp. 1365, 1366, Washington, US; V. E. Dell'Ova et al.: "Ultrasonic Degasser for Use in Liquid Chromatography", p. 1366, col. 2.

Derwent Abstract Accession No. 82-04884J/49, European Pat. No. 65617, 12/1/82.

Derwent Abstract Accession No. 80-087569, Japanese Pat. No. 55087569, Jul. 2, 1980.

Derwent Abstract Accession No. 80-084672, Japanese Pat. No. 55084672, Jun. 26, 180.

Derwent Abstract Accession No. 80-128464, Japanese Pat. No. J55128464, Oct. 4, 180.

*Primary Examiner*—Amelia Burgess Yarbrough
*Attorney, Agent, or Firm*—Staas & Halsey

[57] ABSTRACT

In a process for preparing an ink for a drop-on-demand type ink jet printer, sonic vibration is applied to the ink which is being prepared or has been prepared so that a gas entrained into the ink by incorporation of a dye therein can be removed. This ink can be stably injected through a recording head, even if the size of the head is made smaller to increase the atomizing frequency, or the recording speed.

25 Claims, 2 Drawing Sheets

PROCESS FOR PREPARING INK FOR INK JET PRINTER

This is a continuation of co-pending application Ser. No. 113,409 filed on Oct. 27, 1987 which is a continuation of Ser. No. 779,567, filed on Sep. 24, 1985 both abandoned.

BACKGROUND OF THE INVENTION

1. Field of the Invention

The present invention relates to a process for the preparation of an ink for an ink jet printer. More particularly, the present invention relates to a process for the preparation of an ink which can be stably injected in a so-called drop-on-demand type ink jet printer. Such printers record information, e.g., by injecting ink particles by the action of a piezo-electric element, or by pressure created with bubbles formed by heating.

Description of the Related Art

In a recording head of a drop-on-demand type ink jet printer, ink particles are injected from a pressure chamber through a nozzle to a recording paper in accordance with an electric signal corresponding to information to be recorded. Usually, the recording head is driven by the action of a piezo-electric element provided at the pressure chamber, or by the action of a pressure of bubbles formed by heating a part of an ink in the pressure chamber (so-called bubble jet type).

It is known that, in an ink used for such an ink jet printer, a delay in the transfer of the pressure is caused by gas dissolved in the ink solvent and remaining therein, and the injection response characteristic is therefore degraded (see, for example, Japanese Examined Patent Publication (Kokoku) No. 53-20882 and Japanese Unexamined Patent Publication (Kokai) No. 55-17571). As means for obviating this disadvantage, there has been adopted, for example, a method in which, in the ink-preparing process, the dissolved gas is removed by heating the ink or by a reduction of the pressure therein, and during storage, the ink is contained and stored in a bag or pouch formed of a material having a low gas permeation coefficient, such as an aluminum-laminated film.

On the premise that if a large quantity of dissolved gas is present, the dissolved gas is released as bubbles by an abrupt change in the pressure at the time of the injection of the ink, and the injection response characteristic is thus reduced, we carried out ink injection tests using inks which had been subjected to the gas-removing treatment mentioned above and inks which had not been subjected to that gas-removing treatment. From the test results, we found that even if the dissolved gas remaining in the ink is removed by a reduction of the pressure or by heating, a stable injection could not be performed when a smaller size recording head was used. Nevertheless, it is thought that, to increase the recording speed, the size of the recording head must be reduced.

In Japanese Kokai No. 55-17571 and other publications, an ink jet printer provided with a super sonic vibration applying device is described. However, this device is still directed to remove, from an ink, gas bubbles dissolved in the ink during storage thereof or after the initial removal of gas bubbles by heating the ink or a reduction of the pressure therein. Therefore, a super sonic vibration applying device must be provided to an ink jet printer. Further, provision of a super sonic vibration applying device to an ink jet printer has disadvantages in that the construction of the printer becomes complicated and heating of the ink occurs.

SUMMARY OF THE INVENTION

An object of the present invention is to provide a process for preparing an ink which can be stably injected in a drop-on-demand type ink jet printer.

Another object of the invention is to previously remove, from an ink for a drop-on-demand type ink jet printer, a gas which would otherwise form bubbles during a recording operation by the ink jet printer.

The above and other objects, features and advantages of the invention are attained by a process for preparing an ink for a drop-on-demand type ink jet printer, comprising the steps of dissolving a dye in a portion of a solvent and mixing the resultant system, comprising the dye and the portion of the solvent, with the remaining portion of the solvent to form a homogeneous ink comprising the dye and the solvent, in which sonic vibration is applied to remove a gas entrained in the ink by the incorporation of the dye during the course of the process.

Basically, in the method of present invention, to prevent the formation of bubbles caused by pressure applied to the ink at the recording head, a sonic energy equal to or larger than the energy received by the ink at the recording head is applied in advance to the ink during the preparation process, to remove the bubbles outside the printer and before introduction of the ink into the printer. More particularly, in the present invention, sonic energy is applied to the ink during the preparation process to remove gas entrained in the ink by incorporation of the dye. By experiments, we found that a gas is entrained in an ink when a dye is incorporated in a solvent, and the gas thus entrained in the ink by the dye cannot be removed by a gas-removing treatment such as heating or a reduction of the pressure, but can be removed by the application of sonic vibration.

If the application of sonic vibration is effected after the incorporation of the dye into the solvent, the intended effect can be attained irrespective of the time of the application of the sonic vibration. Even if sonic vibration is applied after the ink has been formed and stored for a while, the intended effect still can be attained. However, an especially good effect is attained when sonic vibration is applied at the time of incorporating the dye into the solvent and/or when the dye is incorporated into a small amount of the solvent while applying sonic vibration and the remainder of the solvent is then added. Accordingly, adoption of this method is preferred. Thus, sonic vibration may be applied preferably during the step of dissolving a dye on a portion of a solvent and/or after the step of mixing a system comprising a dye and a portion of a solvent with the remaining portion of the solvent. Other sequences of mixing a dye and a solvent may be used in the invention. For example, two or more parts of a dye may be incorporated into two or more parts of a solvent, respectively, and the resultant two or more mixtures then mixed with each other and, optionally, with a further part of the solvent. Further, a dye may be a mixture of dyes and a solvent may be a mixture of solvents.

Moreover, since a strong sonic vibration is more effective, it is preferred that a resonance state be produced in the applied sonic waves.

The inks in the present invention are of the type prepared by dissolving a dye in a solvent. The kinds of dye and solvent and the composition of the ink are not particularly critical. For example, as typical dyes to be used in the present invention, there can be mentioned C.I. Acid Red 92, C.I. Direct Red 227, C.I. Reactive Blue 71, C.I. Direct Yellow 50, C.I. Direct Black 19, C.I. Direct Blue 86, C.I. Acid Blue 112, C.I. Acid Red 131, C.I. Direct Yellow 86, and C.I. Reactive Yellow 81. Water is ordinarily used as the solvent, and in many cases, to improve ink characteristics such as the drying property and surface tension, a water-soluble organic solvent such as ethylene glycol, diethylene glycol, propylene glycol or carbitol is incorporated. However, an organic solvent type ink may be used instead of the aqueous ink, and attainment of the intended effect of the present invention is not inhibited even if a surface active agent or an inorganic hygroscopic agent is incorporated in the ink (that is, the solvent).

To remove fine bubbles in the ink, preferably the gas-removing treatment by a reduction of the pressure or by heating is carried out in combination with the treatment of the invention. The thus prepared ink can be injected stably, or will not form bubbles in a recording head of a drop-on-demand type ink jet printer, even if a small size pressure chamber is used in the recording head to increase the recording speed.

Typically, in a specified recording head of a drop-on-demand type ink jet printer, shown in FIGS. 3A and 3B, an ink to which reduction of the pressure at 15 torr for 15 hours is applied can be continuously injected for 1 to 2 minutes; an ink to which heating at 100° C. for 3 hours is applied can be continuously injected for 1 to 2 minutes; and an ink to which sonic vibration is applied can be continuously injected for more than 2 hours when used either soon after or more than 2 months after the application of sonic vibration.

DESCRIPTION OF THE PREFERRED EMBODIMENTS

For comparison with the method of the present invention, experiments using conventional methods for removing gas from an ink by heating or by a reduction of the pressure will be described first.

Figure 1:
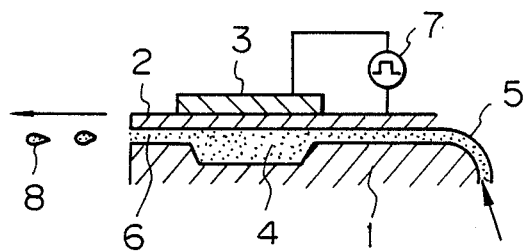
FIG. 1 is a sectional view showing a main part of an example of a recording head of a drop-on-demand type ink jet printer.

FIG. 1 shows an example of a recording head of a drop-on-demand type ink jet printer, in which reference numeral 1 represents a base plate, reference numeral 2 represents a top plate (vibrating plate), reference numeral 3 designates a piezo-electric element, reference numeral 4 designates a pressure chamber, reference numeral 5 represents an ink supply tube, and reference numeral 6 designates a nozzle.

An ink is filled in the pressure chamber 4 through the ink supply tube 5 from an ink vessel (not shown), the piezo-electric element 3 is driven by an electric signal 7 corresponding to information to be recorded, and the top plate 2 is vibrated to compress the ink in the pressure chamber 4, whereby the ink in the pressure chamber 4 is injected in the form of ink drops 8 on a recording paper (not shown) from the nozzle 6 to effect recording.

As mentioned before, on the premise that if a large quantity of a dissolved gas is present, the dissolved gas is released as bubbles by an abrupt change of the pressure at the time of injection of an ink, and the injection response characteristic is thus reduced, we carried out ink injection tests by using inks which had been subjected to the above-mentioned gas-removing treatment and inks which had not been subjected to the gas-removing treatment.

For these tests, the following inks were prepared.

| Ink A | |
|---|---|
| Distilled water | 45 parts by weight |
| Ethylene glycol | 55 parts by weight |
| Dye (C.I. Reactive Blue 71) | 2.8 parts by weight |

The above components were mixed and the mixture was stirred at room temperature to form a solution. The solution was then filtered through a 3 μm-filter to form an ink.

| Ink B | |
|---|---|
| Distilled water | 45 parts by weight |
| Ethylene glycol | 55 parts by weight |
| Dye (C.I. Acid Red 92) | 2.6 parts by weight |

The above components were mixed and mixture was stirred at room temperature to form a solution. The solution was then filtered through a 3 μm-filter to form an ink.

| Ink C | |
|---|---|
| Distilled water | 45 parts by weight |
| Ethylene glycol | 55 parts by weight |
| Dye (C.I. Direct Yellow 50) | 2.8 parts by weight |

The above components were mixed and the mixture was stirred at room temperatures to form a solution. The solution was then filtered through a 3 μm-filter to form an ink.

| Ink D | |
|---|---|
| Distilled water | 45 parts by weight |
| Ethylene glycol | 55 parts by weight |
| Dye (C.I. Direct Red 227) | 2.6 parts by weight |

The above components were mixed and the mixture was stirred at room temperature to form a solution. The solution was then filtered through a 3 μm-filter to form an ink.

| Ink E | |
|---|---|
| Distilled water | 45 parts by weight |
| Ethylene glycol | 55 parts by weight |
| Dye (C.I. Direct Black 19) | 2.0 parts by weight |

The above components were mixed and the mixture was stirred at room temperature to from a solution. The solution was then filtered through a 3 μm-filter to form an ink.

Figure 2A:
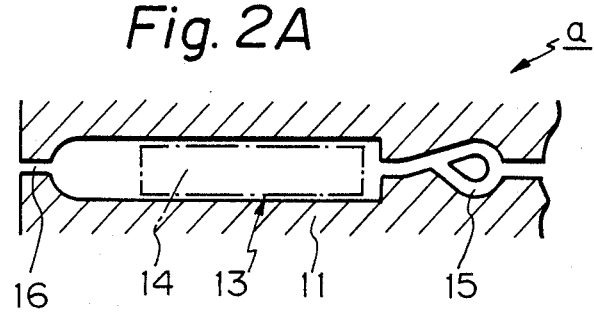
FIGS. 2A and 2B are sectional views of a recording head a manufactured by way of trial, seen from above and from the side, respectively.
Figure 2B:
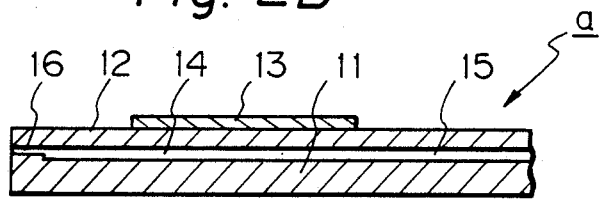

For the tests, a recording head a shown in FIGS. 2A and 2B was fabricated by way of trial. In FIGS. 2A and 2B, reference numeral 11 represents a ceramic (alumina) base plate, reference numeral 12 represents a glass sheet, reference numeral 13 designates a piezoelectric element, reference numeral 14 designates a pressure chamber, reference numeral 15 represents an ink supply path, and reference numeral 16 designates a nozzle. The glass sheet 12 had a thickness of 0.3 mm, the piezo-electric element 13 had a width of 1.4 mm and a length of 20 mm, and the pressure chamber 14 had a width of 1.45 mm and a depth of 0.1 mm.

In this recording head, the injection tests were carried out by using the inks A through E which had been subjected to the gas-removing treatment by reduction of the pressure; ink B which had been subjected to the gas-removing treatment by heating; and inks A through C which had not been subjected to the gas-removing treatment, and the states in the head were observed. Note, removal of the gas by the gas-removing treatment was confirmed by a dissolved-oxygen meter, and injection was carried out at an atomizing frequency of 1 kHz.

Figure 2C:
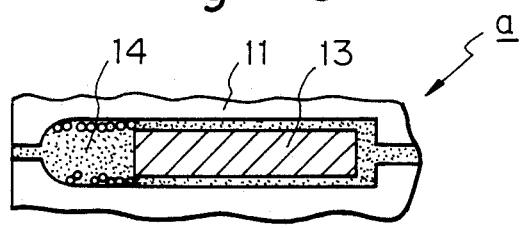
FIG. 2C is a plan view of the recording head shown in FIGS. 2A and 2B.

The results obtained are shown in Table 1. No substantial difference of the ink injection state was brought about by the presence or absence of the gas-removing treatment by reduction of the pressure. Furthermore, in the case of inks A and B, very fine bubbles having a diameter of about 0.1 mm were found to flow from the pressure chamber 14, as shown in FIG. 2C. However, these fine bubbles were ordinarily discharged from the nozzle 16 as they were. Accordingly, even if the injection test was continuously conducted for 30 minutes, injection could be stably performed. If a fin or the like was present on the wall surface of the ink path, sometimes parts of the bubbles were trapped by the fin or the like and gathered to form large bubbles, and as a result, injection became unstable.

Figure 3A:
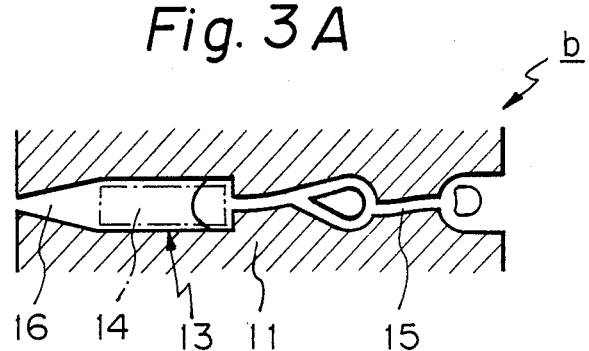
FIGS. 3A and 3B are sectional views of a recording head b manufactured by way of trial, seen from above and from the side, respectively.
Figure 3B:
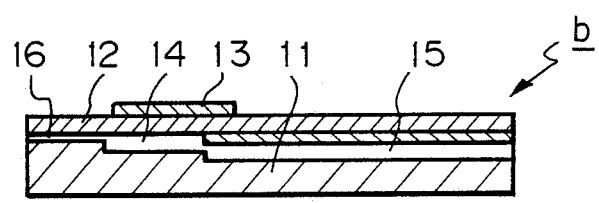

Then, a recording head b in which the size of the pressure chamber was reduced to increase the atomizing frequency and recording speed was fabricated by way of trial. This recording head b is shown in FIG. 3. Members corresponding to those of the recording head a are represented by the same reference numerals. However, both the base plate 11 and top plate 12 were formed from stainless steel. The top plate 12 had a thickness of 0.2 mm, the piezo-electric element 13 had a width of 1.4 mm and a length of 5 mm, and the pressure chamber 14 had a width of 1.6 mm and a depth of 0.05 mm.

The same injection tests as described above were carried out by using this recording head b.

The results of the tests using the recording head b are shown in Table 1. When the test was repeated 30 times, using ink B, the injection speed was drastically reduced within 30 seconds at each time from the start of injection and satellite particles were formed, and therefore, normal injection became impossible. In the case of inks other than ink B, injection also became impossible. Although the interiors of the pressure chamber and path of the recording head b could not be observed, since the injection became unstable, it is obvious that bubbles were present in the ink when the recording head b was used.

TABLE 1

| Ink | Gas-Removing Treatment | Injection Stability | |
|---|---|---|---|
| | | Head a (1 kHz) | Head b (2 kHz) |
| A | reduction of pressure | o | Δ or o |
| A | not performed | o | Δ or o |
| B | reduction of pressure | o or Δ | x |
| B | not performed | o or Δ | x |
| C | reduction of pressure | o | o |
| C | not performed | o | o |
| D | reduction of pressure | o or Δ | x |
| E | reduction of pressure | Δ | Δ |
| B | heating | o | x |

Note
o: stable
x: unstable
Δ: slightly unstable

From the foregoing test results, we found that even if the dissolved gas remaining in the ink is removed by a reduction of the pressure or by heating, a stable injection could not be performed when the recording head b was used. The recording head b was smaller in size than the recording head a. However, to increase the recording speed, it seems to be necessary to reduce the size of the recording head.

As can be seen in Table 1, when ink B was injected by using the recording head b, even if the gas-removing treatment was carried out by a reduction of the pressure or by heating, it was impossible to stabilize the injection. When the head a was used, the ink could be tentatively stably atomized, although the formation of some bubbles was observed. It is considered that this is because, in the head b, bubbles were formed in larger quantities than in the head a. Namely, it is considered that since the depth of the pressure chamber in the head b was smaller than in the head a, a higher sonic pressure energy was applied to the ink in the pressure chamber and bubbles were formed in larger quantities.

Figure 4:
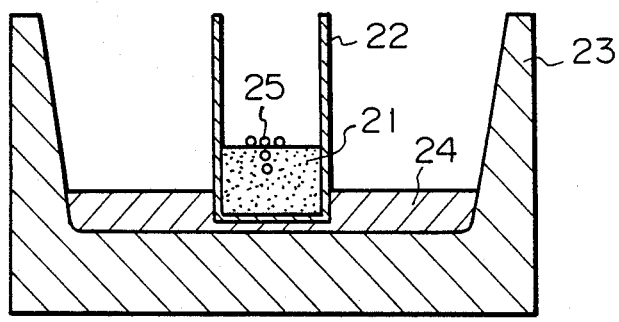
FIG. 4 is a sectional view illustrating the removal of bubbles by an ultrasonic washing device.

Based on the presumption that if strong sonic vibration was transmitted to the ink, even outside the head, bubbles would be formed, as shown in FIG. 4, about 20 ml of the ink B 21 was charged in a glass bottle 22 having a capacity of 100 ml and sonic vibration was applied by using an ultrasonic washing device 23 (BRANSONIC 220 supplied by Bransonic Co.; 55 KHz; 100 W). The amount of water 24 to be charged in the washing tank was adjusted so that resonance occurred in the ultrasonic waves. After 1 to 2 seconds from the start of application of the vibration, a vigorous formation of bubbles 25 occurred in the ink and this formation of bubbles terminated after 10 to 15 seconds.

When the ink B was charged in the head b after bubbles had been thus formed, the ink B could be injected stably for a long time, although stable injection of the ink B ordinarily became impossible within 30 seconds as pointed out hereinbefore.

Accordingly, other inks were tested by applying sonic vibration as shown in FIG. 4 after the gas-removing treatment by a reduction of the pressure. Not only the inks A through E prepared above but also commercially available inks for an ink jet printer were tested. Furthermore, ink solvents free of a dye were similarly tested for comparison. The test results are shown in Table 2.

TABLE 2

| Ink | | Formation of bubbles |
|---|---|---|
| Ink Manufactured by Way of Trial | A | Conspicuous |

TABLE 2-continued

|  | Ink | Formation of bubbles |
|---|---|---|
| Commercially Available Ink for Ink Jet Printer | B | Observed |
|  | C | Not observed |
|  | D | Conspicuous |
|  | E | Observed |
|  | Cyan supplied by S Co. | Observed |
|  | Magenta supplied by S Co. | Observed |
|  | Yellow supplied by S Co. | Slight |
|  | Black supplied by S Co. | Conspicuous |
|  | Black supplied by K Co. | Observed |
|  | Black supplied by M Co. | Observed |
|  | Black supplied by I Co. | Conspicuous |
| Comparison | 50% by weight aqueous solution of ethylene glycol | Not observed |
|  | 40% by weight aqueous solution of carbitol | Not observed |

Note:
Each ink was tested in an amount of 20 ml after the gas-removing treatment by a reduction of the pressure.

When ultrasonic vibration was applied in the above-mentioned manner, bubbles were formed in most of the tested inks. However, no bubbles were formed in the ink solvent free of the dye.

It has been confirmed by analysis of the gas is the bubbles by a gas mass analyzer that the gas is composed mainly of nitrogen, oxygen, and carbon dioxide. However, it has not been sufficiently elucidated how this gas becomes present in the ink. That is, the state of the gas present in the ink has not been elucidated. Since the state of the formation of bubbles differs according to the kind of dye used, it is construed that the gas is present in the ink in the state where the gas is combined with the dye in some manner or other, and the combined gas is isolated from the dye by a change in the sonic pressure.

As seen from the foregoing, if a strong sonic vibration is transmitted to an ink to form bubbles in the ink, the injection stability can be improved. In this case, however, no bubbles are generated unless a sonic energy is used that is equal to of larger than the energy received by the ink in the recording head. Therefore, it is difficult to effect a bubble-removing treatment in a large quantity o±the ink at one time. For example, if the amount of the ink is increased to 40 ml from 20 ml in the system shown in FIG. 4, no substantial formation of the bubbles is observed. Accordingly, we carried out investigations with a view to developing a method suitable for the treatment of a large quantity of ink.

When a dye is dissolved in a solvent, very fine bubbles are generally formed. It ultrasonic vibration is applied in this state, these fine bubbles grow to form large bubbles which can be easily discharged to the outside. If the solvent is composed solely of water, these fine bubbles are formed in larger quantities than in the case of a solvent containing an organic solvent. Furthermore, at a higher dye concentration, fine bubbles are formed in larger quantities. About 500 g each of inks A through E and the following inks F through 0 were prepared by way of trial.

| Ink F | |
|---|---|
| Distilled water | 25 parts by weight |
| Dye (C.I. Acid Red 92) | 2.6 parts by weight |

The above components were mixed and the mixture was stirred at room temperature to form a solution. The solution was then mixed with the following components and filtered through a 3 μm-filter to obtain an ink.

| Distilled water | 20 parts by weight |
|---|---|
| Ethylene glycol | 55 parts by weight |
| Ink G | |
| Distilled water | 25 parts by weight |
| Dye (C.I. Direct Red 227) | 2.6 parts by weight |

The above components were mixed and the mixture was stirred at room temperature to form a solution. The solution was then mixed with the following components and filtered through a 3 μm-filter to form an ink.

| Distilled water | 20 parts by weight |
|---|---|
| Ethylene glycol | 55 parts by weight |
| Ink H | |
| Distilled water | 25 parts by weight |
| Dye (C.I. Acid Red 92) | 2.6 parts by weight |

The above components were mixed in a flask having a capacity of 500 ml and a solution was formed while transmitting sonic vibration therethrough by using an ultrasonic washing device (BRANSONIC 220). The solution was then mixed with the following components and filtered through a 3 μm-filter to form an ink.

| Distilled water | 20 parts by weight |
|---|---|
| Ethylene glycol | 55 parts by weight |
| Ink I | |
| Distilled water | 25 parts by weight |
| Dye (C.I. Direct Red 227) | 2.6 parts by weight |

The above components were mixed in a flask having a capacity of 300 ml and a solution was formed while transmitting sonic vibration therethrough by the ultrasonic washing device. The solution was then mixed with the following components and filtered through a 3 μm-filter to form an ink.

| Distilled water | 20 parts by weight |
|---|---|
| Ethylene glycol | 55 parts by weight |
| Ink J | |
| Distilled water | 25 parts by weight |
| Dye (C.I. Direct Red 227) | 2.6 parts by weight |

The above components were mixed in a flask having a capacity of 500 ml and a solution was formed while transmitting sonic vibration therethrough by using an ultrasonic washing device. The solution was then mixed with the following components, sonic vibration was again transmitted therethrough, and the solution was then filtered through a 3 μm-filter to form in ink.

| Distilled water | 20 parts by weight |
|---|---|
| Ethylene glycol | 55 parts by weight |
| Ink K | |
| Distilled water | 25 parts by weight |
| Dye (C.I. Acid Red 92) | 2.6 parts by weight |

The above components were mixed in a flask having a capacity of 500 ml and a solution was formed while transmitting sonic vibration therethrough by using the ultrasonic washing device. The solution was then mixed with the following components, sonic vibration was again transmitted therethrough, and the solution was then filtered through a 3 μm-filter to form an ink.

| Distilled water | 20 parts by weight |
|---|---|
| Ethylene glycol | 55 parts by weight |
| Ink L | |
| Distilled water | 25 parts by weight |
| Dye (C.I. Direct Blue 86) | 2.8 parts by weight |

The above components were mixed is a flask having a capacity of 500 ml and a solution was formed while transmitting sonic vibration therethrough by using an ultrasonic washing device. The solution was then mixed with the following components, sonic vibration was again transmitted therethrough, and the solution was then filtered through a 3 μm-filter to form an ink.

| Ethylene glycol | 55 parts by weight |
|---|---|
| Diethylene glycol | 20 parts by weight |
| Ink M | |
| Distilled water | 25 parts by weight |
| Dye (C.I. Direct Black 19) | 2.0 parts by weight |

The above components were mixed in a flask having a capacity of 500 ml and a solution was formed while transmitting sonic vibration therethrough by using an ultrasonic washing device. The solution was mixed with the following components, sonic vibration was again transmitted therethrough, and the solution was then filtered through a 3 μm-filter to form in ink.

| Distilled water | 30 parts by weight |
|---|---|
| Propylene glycol | 45 parts by weight |
| Ink N | |
| Distilled water | 25 parts by weight |
| Dye (C.I. Acid Red 92) | 2.6 parts by weight |

The above components were mixed in a flask having a capacity of 500 ml and a solution was formed while transmitting sonic vibration therethrough by using an ultrasonic washing device. The solution was mixed with the following components, sonic vibration was again transmitted therethrough, and the solution was then passed through a 3 μm-filter to form an ink.

| Distilled water | 20 parts by weight |
|---|---|
| Ethylene glycol | 35 parts by weight |
| Carbitol | 20 parts by weight |
| Ink O | |
| Distilled water | 45 parts by weight |
| Ethylene glycol | 55 parts by weight |
| Dye (C.I. Acid Red 92) | 2.6 parts by weight |

The above components were mixed in a flask having a capacity of 500 ml and a solution was formed while transmitting sonic vibration therethrough, by using an ultrasonic washing device. The solution was then filtered through a 3 μm-filter to form an ink.

With respect to each of the inks A through 0, the injection test was carried out in the following manner. Namely, after bubbles were removed by a reduction of the pressure, the ink was injected continuously for 30 minutes at an atomizing frequency of 2 kHz and a particle speed of 3 m/sec by using the head b. For the driving pulse, the pulse duration was 30 μs and the pulse fall time was less than 1 μs. The obtained results are shown in Table 3.

TABLE 3

| Ink | Injection Stability | Ink | Injection Stability |
|---|---|---|---|
| A | Δ or o | I | Δ |
| B | x | J | o |
| C | o | K | o |
| D | x | L | o |
| E | Δ | M | o |
| F | x | N | o |
| G | x | O | Δ or o |
| H | o or Δ | | |

Note
o: stable
x: unstable
Δ: slightly unstable

Next, other continuous injection tests were performed at an atomizing frequency of 3 kz and a particle speed of 3 m/sec by using a head similar to the head b. For the driving pulse, the pulse duration was 30 μs and the pulse fall time was 100 μs. The inks used in these tests were prepared as follows:

| Inks $P_A$ and $P_B$ | |
|---|---|
| Distilled water | 135 parts by weight |
| Dye (C.I. Acid Red 92) | 13 parts by weight |

The above components were mixed in a flask and a solution was formed while transmitting sonic vibration therethrough by using an ultrasonic washing device. The solution was then mixed with 365 parts by weight of ethylene glycol and sonic vibration was again transmitted therethrough to ±form an ink $P_A$.

| Distilled water | 135 parts by weight |
|---|---|
| Dye (C.I. Direct Red 227) | 13 parts by weight |

The above components were mixed in a flask and a solution was formed while transmitting sonic vibration therethrough by using an ultrasonic washing device. The solution was then mixed with 365 parts by weight of ethylene glycol and sonic vibration was again transmitted therethrough to form an ink $P_B$.

Ink P ($P_A + P_B$)

400 parts by weight of the Ink $P_A$ and 100 parts by weight of the Ink $P_B$ were mixed and sonic vibration was transmitted therethrough, and the solution was then filtered through a 3 μm-filter to form an ink P.

Ink Q

Ink Q was prepared in a manner similar to that of the ink P except that ink Q was prepared without the application of sonic vibration during the procedure.

In a continuous injection test, ink P could be stably injected in all nozzles of the recording heads for more than 180 minutes. When the ink Q was used, however, injection became unstable in the nozzles of all of the heads soon after starting injection at 3 kHz, injection stopped in all nozzles of the heads within one minute, and bubbles could be seen in the ink which was ejected from the nozzles by purging. All of nozzles in which injection stopped could be recovered by purging.

From the foregoing test results, the following can be seen.

(1) If sonic vibration is transmitted to effect the removal of bubbles in the ink-preparing process, especially at the step of incorporating (dissolving) a dye into a solvent or within a short time after the incorporation, the injection stability is highly improved. More specifically, for example, when the inks B, F, H, and K having the same composition are compared, it is seen that although the injection stability is bad in the inks B and F through which sonic vibration was not transmitted, the injection stability is good in the inks H and K through which sonic vibration was transmitted during the preparation process. This difference is similarly observed among the inks D, G, and J.

Further, advantageously, an ink through which sonic vibration is transmitted to effect the removal of bubbles has a good injection stability even at a higher atomizing frequency. This can be seen in the experiment using ink P at an atomizing frequency of 3 kHz.

(2) When a dye is added to a part of a solvent (especially water) and the remainder of the solvent is then added after removal of bubbles by the application of sonic vibration, the effect attained by the sonic vibration is enhanced over the effect attained when the dye is added to all of the solvent and the sonic vibration is then given transmitted therethrough. More specifically, when the inks 0, K and N having the same composition are compared, it is seen that, in contrast with the ink 0 through which sonic vibration is transmitted after the addition of the dye to all of the solvent, the injection stability is highly improved in the inks K and N formed by adding the dye to a small amount of the solvent, applying sonic vibration to the mixture, and then adding the remainder of the solvent to the mixture.

The storage stability of the ink prepared according to the invention was examined.

300 g each of the inks J and K were independently charged in plastic vessels having a capacity of 1 liter, and the inks were allowed to stand in contact with the air for 2 months. Each ink was filled in the head b without removing the gas by a reduction of the pressure and was then injected. Injection could be performed as stably as in the case where the ink was injected before standing. From this fact, it is seen that the gas generated by sonic vibration has properties different from those of the gas dissolved and left in the solvent, and if this gas is once removed by the application of sonic vibration, the effect of the present invention remains.

However, as is apparent from the results shown in Tables 1 and 2, it is not always true that, in the case where bubbles are generated by the application of sonic vibration, injection inevitably becomes unstable. The following two reasons are considered to account for this:

(1) The amount of bubbles generated on the head is small.

(2) Formed bubbles are promptly discharged from the nozzle.

However, the above phenomenon is influenced by the shape of the head and the surface roughness of the ink path. For example, as pointed out hereinbefore, if a fin or the like is present on the wall surface of the ink path, bubbles are trapped by the fin or the like, and the injection stability is greatly influenced according to the shape of the pressure chamber. Accordingly, in designing and constructing the recording head, care should be taken that the generation of bubbles is controlled and the discharge of bubbles is promoted. Furthermore, in the ink, it is necessary that such a gas should be removed in advance.

We claim:

1. A process for preparing an ink before its introduction into a drop-on-demand type ink jet printer comprising:
    dissolving a water soluble dye in a solvent comprising water to present an ink solution; and
    applying sonic vibration to the ink solution during the dissolving of the dye into the solvent to remove gas entrained into the ink solution with the dye.

2. A process according to claim 1, further comprising applying a vacuum to the ink solution or heating the ink solution to remove gas dissolved into the ink solution.

3. A process according to claim 1, wherein the solvent also comprises a water-miscible organic solvent.

4. A process according to claim 3, wherein the dissolving step comprises dissolving the dye in water and then mixing the resultant system comprising dye and water with a water-miscible organic solvent or a mixture of a water-miscible organic solvent and water.

5. A process according to claim 3, wherein the dissolving step comprises dissolving the dye in a mixture of water and a first water-miscible organic solvent and mixing the resultant system comprising the dye, the water, and the first organic solvent with a second water-miscible organic solvent or a mixture of a second water-miscible organic solvent and water.

6. A process according to claim 1, wherein said sonic vibration is applied in such a manner that a resonant state occurs in the sonic waves in the ink solution.

7. A process according to claim 1, further comprising applying a vacuum to the ink solution and heating the ink solution to remove gas dissolved in the ink solution.

8. A process according to claim 1, wherein the energy of the sonic vibration applied to the ink solution is equal to or larger than the energy which will be received by the ink at a recording head of the ink jet printer.

9. A process according to claim 1, wherein the frequency of the sonic vibration applied to the ink solution is in the range of 2 to 55 kHz.

10. A process for preparing an ink before its introduction into a drop-on-demand type ink jet printer comprising:
    dissolving a water soluble dye in a first solvent portion comprising water to present a first system comprising the dye and the first solvent portion;
    mixing the first system with a second solvent portion that is miscible with said first solvent portion to present a homogenous ink solution;
    applying sonic vibration to the first system during the dissolving of the dye into the first solvent portion or to the homogenous ink solution after it is formed to remove gas entrained into the ink solution with the dye.

11. A process according to claim 10, wherein the first solvent portion also comprises a water-miscible organic solvent.

12. A process according to claim 10, wherein the second solvent portion comprises a water-miscible organic solvent or a mixture of a water-miscible organic solvent and water.

13. A process according to claim 10, wherein the dissolving step comprises dissolving the dye in a mixture of water and a first water-miscible organic solvent, and the second solvent portion comprises a second water-miscible organic solvent or a mixture of a second water-miscible organic solvent and water.

14. A process according to claim 10, wherein said sonic vibration is applied in such a manner that a resonant state occurs in the sonic waves in the first system or in the ink solution.

15. A process according to claim 10, further comprising applying a vacuum to the ink solution and heating the ink solution to remove gas dissolved in the ink solution.

16. A process according to claim 10, wherein the energy of the sonic vibration applied to the first system or the ink solution is equal to or larger than the energy which will be received by the ink at a recording head of the ink jet printer.

17. A process according to claim 10, wherein the frequency of the sonic vibration applied to the first system or to the ink solution is in the range of 2 to 55 kHz.

18. A process according to claim 17, further comprising applying a vacuum to the ink solution or heating the ink solution to remove gas dissolved in the ink solution.

19. A process according to claim 1, wherein said solvent also comprises at least one of ethylene glycol, diethylene glycol, propylene glycol and carbitol.

20. A process according to claim 17, wherein said second solvent portion comprises at least one of ethylene glycol, diethylene glycol, propylene glycol and carbitol.

21. A process according to claim 20, wherein said second solvent portion comprises ethylene glycol.

22. A process according to claim 20, wherein said second solvent portion comprises diethylene glycol.

23. A process according to claim 20, wherein said second solvent portion comprises propylene glycol.

24. A process according to claim 20, wherein said second solvent portion comprises carbitol.

25. A process according to claim 20, wherein said second solvent portion comprises a mixture of ethylene glycol and carbitol.

* * * * *

UNITED STATES PATENT AND TRADEMARK OFFICE
CERTIFICATE OF CORRECTION

PATENT NO. : 4,948,427

DATED : August 14, 1990

INVENTOR(S) : YASUO YAMAGISHI, TOSHIAKI NARUSAWA and KATSUHI EBISU

It is certified that error appears in the above-identified patent and that said Letters Patent is hereby corrected as shown below:

Column 5, line 7, "piezoelectric" and substitute --piezo-electric--.

Column 7, line 46 "o±the" should be --of the--.

Column 10, line 34, delete "±".

Signed and Sealed this

Third Day of December, 1991

*Attest:*

HARRY F. MANBECK, JR.

*Attesting Officer*      *Commissioner of Patents and Trademarks*